US010459082B2

(12) United States Patent
Haag et al.

(10) Patent No.: US 10,459,082 B2
(45) Date of Patent: Oct. 29, 2019

(54) METHOD AND DEVICE FOR SECURING A SPACE CROSSED BY A HIGH-POWER LASER BEAM

(71) Applicant: ARIANEGROUP SAS, Paris (FR)

(72) Inventors: Hervé Haag, Elancourt (FR); Thibault de la Villegeorges, Triel sur Seine (FR); Bruno Esmiller, Villennes sur Seine (FR)

(73) Assignee: ArianeGroup SAS, Paris (FR)

( * ) Notice: Subject to any disclaimer, the term of this patent is extended or adjusted under 35 U.S.C. 154(b) by 91 days.

(21) Appl. No.: 15/745,405

(22) PCT Filed: Jul. 20, 2016

(86) PCT No.: PCT/FR2016/000124
§ 371 (c)(1),
(2) Date: Jan. 16, 2018

(87) PCT Pub. No.: WO2017/013315
PCT Pub. Date: Jan. 26, 2017

(65) Prior Publication Data
US 2018/0210081 A1    Jul. 26, 2018

(30) Foreign Application Priority Data

Jul. 22, 2015    (FR) ...................... 15 01554

(51) Int. Cl.
*G01S 17/02*  (2006.01)
*G01S 7/484*  (2006.01)
(Continued)

(52) U.S. Cl.
CPC ............ *G01S 17/026* (2013.01); *F41A 17/08* (2013.01); *F41H 13/005* (2013.01); *G01S 7/484* (2013.01); *G01S 7/497* (2013.01); *G01V 8/20* (2013.01)

(58) Field of Classification Search
CPC ........ G01S 17/00; G01S 17/02; G01S 17/023; G01S 17/026; G01S 7/484; G01S 7/486;
(Continued)

(56) References Cited

U.S. PATENT DOCUMENTS 9,846,235 B2 * 12/2017 Aharoni ................. G01S 17/74
2005/0098545 A1 * 5/2005 de la Cal ........... B23K 26/0096
219/121.62

(Continued)

FOREIGN PATENT DOCUMENTS

DE      102005019233 A1    11/2006
EP      2485064 A1    8/2012
(Continued)

OTHER PUBLICATIONS

International Search Report dated Nov. 10, 2016, issued in corresponding International Application No. PCT/FR2016/000124, filed Jul. 21, 2016, 3 pages.
(Continued)

*Primary Examiner* — John R Lee
(74) *Attorney, Agent, or Firm* — Christensen O'Connor Johnson Kindness PLLC

(57) ABSTRACT

A method and a device for securing a space crossed by a high-power laser beam. A security laser beam is produced in the form of an envelope surrounding said high-power laser beam and the emission of the latter is forbidden when an object comes into contact with said envelope.

13 Claims, 2 Drawing Sheets

(51) Int. Cl.
*G01V 8/20* (2006.01)
*G01S 7/497* (2006.01)
*F41H 13/00* (2006.01)
*F41A 17/08* (2006.01)

(58) Field of Classification Search
CPC .................. G01S 7/497; G01S 7/483; G01S 7/48; G01V 8/20; G01V 8/10; G01V 8/12; G01V 8/26; F41A 17/00; F41A 17/06; F41A 17/08; F41A 17/02; F41H 13/00; F41H 13/0043; F41H 13/005; F41H 13/0056; F41H 13/0062; F41H 13/0087
See application file for complete search history.

(56) References Cited

U.S. PATENT DOCUMENTS

2010/0282942 A1* 11/2010 Mosier .................. F41H 13/005
250/203.2
2011/0043785 A1 2/2011 Cates et al.
2017/0008621 A1* 1/2017 Fritz .................... B64C 27/008
2018/0210081 A1* 7/2018 Haag .................... G01S 17/026

FOREIGN PATENT DOCUMENTS

| WO | 97/21261 A1 | 6/1997 |
| WO | 2011/121333 A1 | 10/2011 |
| WO | 2012/010839 A1 | 1/2012 |
| WO | 2013/026180 A1 | 2/2013 |

OTHER PUBLICATIONS

Written Opinion of the International Searching Authority dated Nov. 10, 2016, issued in corresponding International Application No. PCT/FR2016/000124, filed Jul. 21, 2016, 5 pages.

Written Opinion of the International Searching Authority dated Nov. 10, 2016, issued in corresponding International Application No. PCT/FR2016/000124, filed Jul. 20, 2016, 6 pages.

International Preliminary Report on Patentability dated Jan. 23, 2018, issued in corresponding International Application No. PCT/FR2016/000124, filed Jul. 20, 2016, 1 page.

* cited by examiner

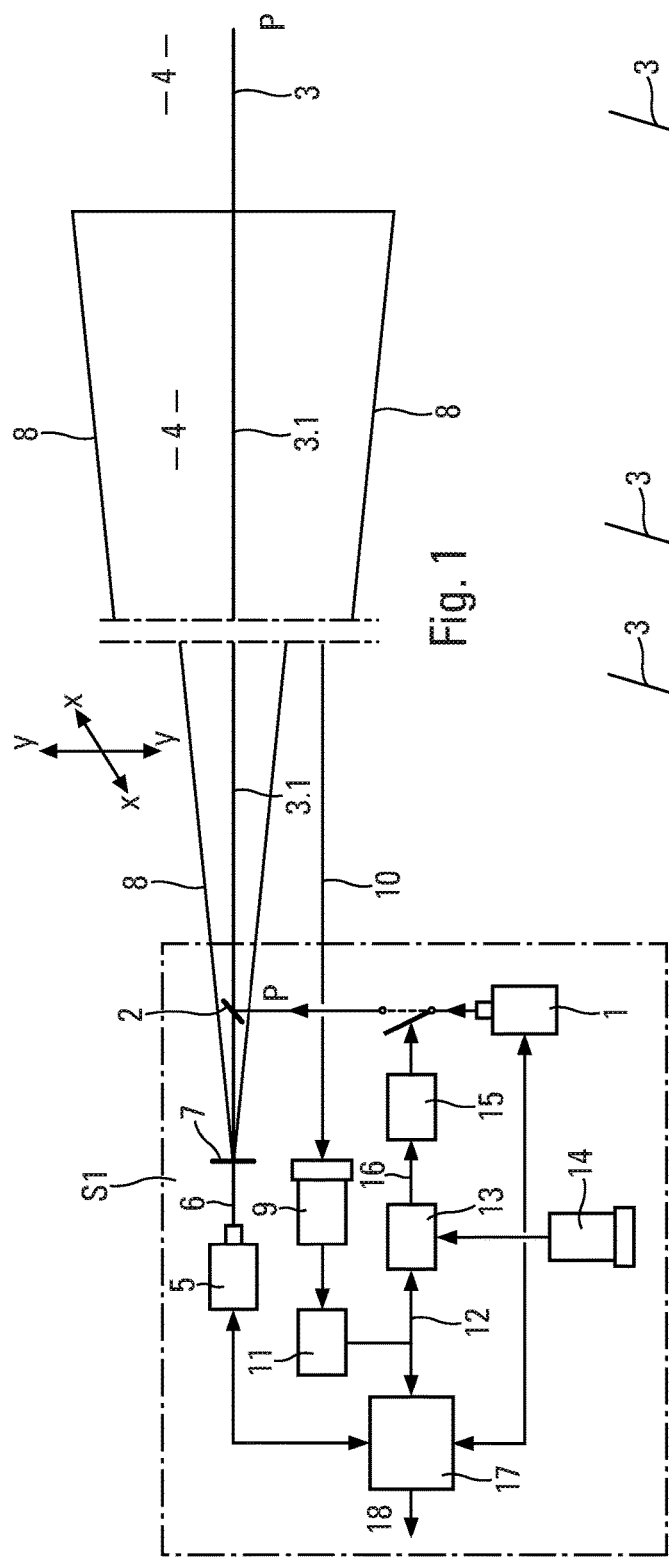
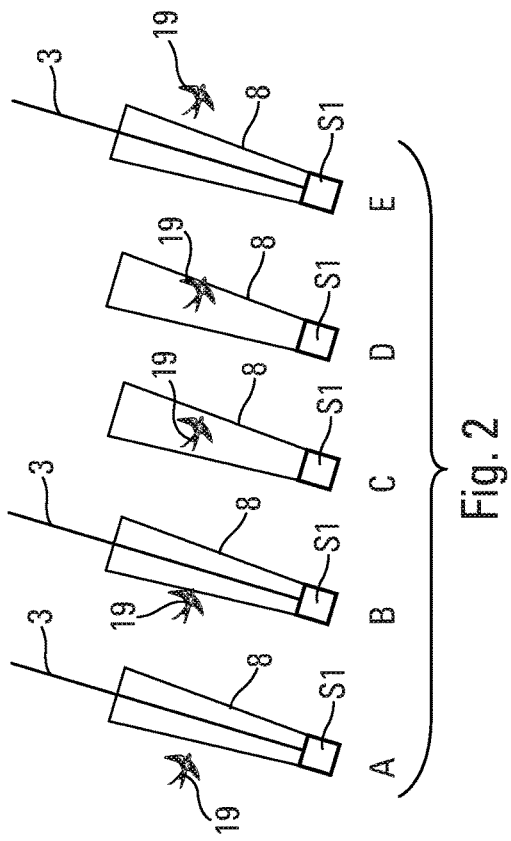
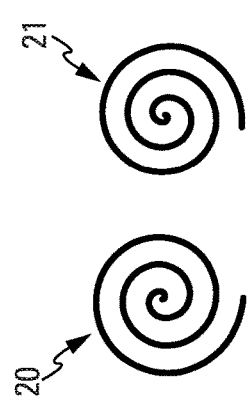

METHOD AND DEVICE FOR SECURING A SPACE CROSSED BY A HIGH-POWER LASER BEAM

The present invention relates to a method and to a device for ensuring the safety of a space through which a high-power laser beam passes.

It is known that, in order to protect an object (person, animal, aircraft, etc.) from injuries and damage capable of being inflicted by a high-power laser beam, it is commonplace to monitor the space (terrestrial space or airspace) in which said laser beam is generated by a radar system or by an optical camera. As such, when such an object is detected by the radar system or by the camera, measures can be taken to avoid said object coming into contact with said laser beam, such as deactivating the laser beam or diverting said object.

Besides the fact that a known solution of this kind is generally expensive, it has the significant disadvantage of implementing means (radar system or optical camera) which are independent of the high-power laser beam, which complicates and prolongs the protection procedures, and undermines safety.

WO 97/21261 describes a system including means for generating a low-power safety beam, and a power beam. The low-power safety beam, which surrounds the power beam, detects any object penetrating the envelope created by the low-power safety beam.

WO 2011/121333 describes a dazzler device in which the intensity of the dazzle beam is modulated according to the range of a target to be dazzled.

The object of the present invention is to overcome these drawbacks.

For this purpose, according to the invention, the method for ensuring the safety of a space through which a high-power laser beam passes is characterised in that:
  at least one low-power-density safety laser beam is generated in the form of an envelope which is positioned and aligned so as to surround said high-power laser beam over at least a portion of the length thereof; and
  the emission of said high-power laser beam is prevented when an object encounters said safety laser beam.

As such, according to the invention, the safety laser and the high-power laser form a narrow-field whole and point in the same direction, which simplifies the detection of said object and makes this detection more robust. Furthermore, this detection is active, such that the detection capability of the present invention is greater than that of a camera.

In order to protect the operators of the high-power laser beam generator, said safety beam surrounds at least the initial portion (close to said generator) of said high-power laser beam. The safety is thus advantageously ocular.

Preferably, said safety laser beam is in the form of a conical envelope that diverges in said space to be made safe.

In an advantageous embodiment, the emission of said high-power laser beam is prevented when an object encounters said safety laser beam for the first time, and the emission of said high-power laser beam is re-established when said object encounters said safety laser beam for a second time.

When, as is commonplace, said high-power laser beam can be moved in order to scan said space to be made safe, said safety laser beam is moved together with said high-power laser beam.

In order to prevent accidents when starting up said high-power laser beam, before said beam is emitted, said safety laser beam traces at least one scanning pattern, which makes it possible to ensure there are no objects within said envelope formed by said safety laser beam. A scanning pattern of this kind may be at least one spiral.

In one embodiment of the method according to the present invention, which method makes it possible to ensure the safety of said space at different distances or altitudes within said space, a plurality of coaxial safety laser beams are generated and arranged one after the other, each of said safety laser beams being embedded in part in the preceding safety laser beam, having a greater power density than that of the preceding safety laser beam, and having a smaller divergence than that of the preceding safety laser beam.

The present invention also relates to a device for ensuring the safety of a space through which a high-power laser beam passes, comprising:
  at least one generator of a low-power-density safety laser beam;
  an optical element for giving said safety laser beam the form of a conical envelope which diverges in said space and is positioned and aligned so as to surround said high-power laser beam over at least a portion of the length thereof;
  a photodetector which monitors said envelope formed by the safety laser beam; and
  means for triggering the emission of said high-power laser beam, which means are controlled by said photodetector.

Said optical element for giving said safety laser beam the form of a conical envelope can be a rotating mirror or an axicon. In the case of the latter, said photodetector can monitor said envelope of the safety laser beam through said axicon.

Preferably, the device according to the present invention comprises means for adjusting the detection threshold of said photodetector to the ambient light.

The present invention also relates to a high-power laser system comprising a safety device such as described above.

The figures of the accompanying drawings will show how the invention can be carried out. In these figures, identical reference signs denote similar elements.

FIG. 1 shows a block diagram of an embodiment of the laser system according to the present invention.

Diagrams A to E in FIG. 2 schematically show a mode of operation of the laser system from FIG. 1.

FIG. 3 shows spiral scanning patterns.

Figure 4:
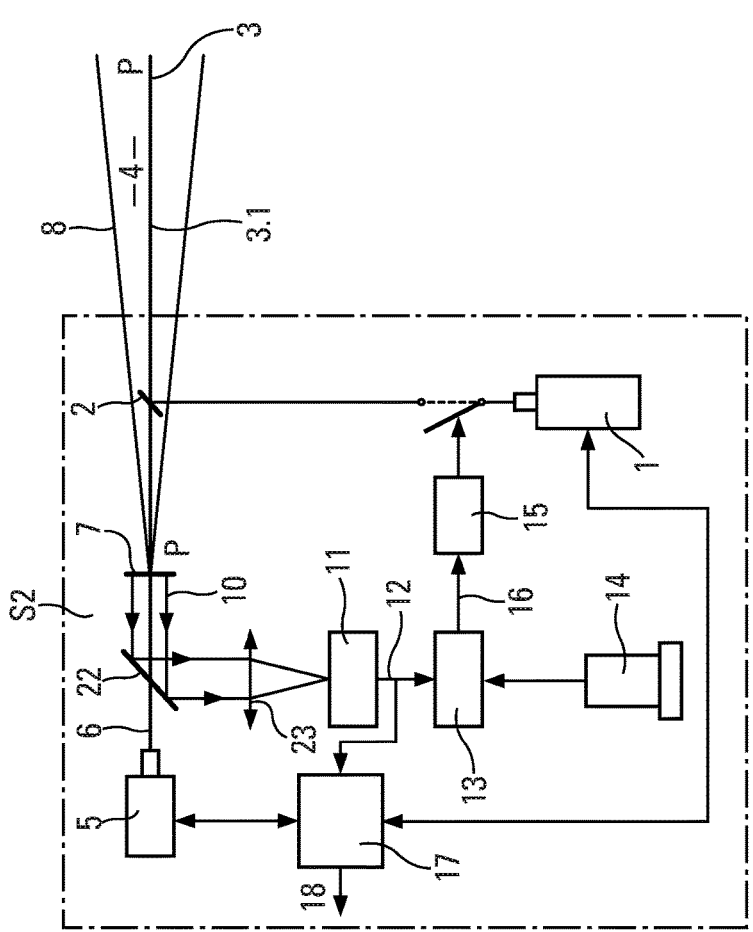
FIG. 4 shows a block diagram of a variant of the laser system according to the present invention.
Figure 5:
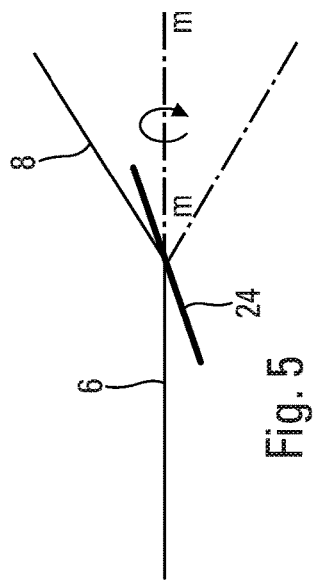

FIG. 5 schematically shows an optical element for the laser system from FIGS. 1 to 4.

Figure 6:
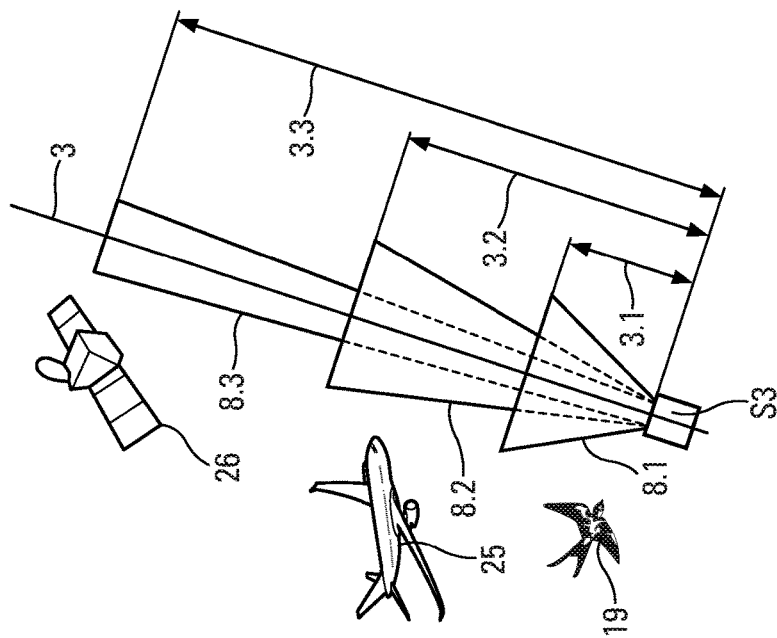

FIG. 6 schematically shows an application of the laser system according to the present invention.

The high-power laser system S1, according to the present invention and shown schematically in FIG. 1, comprises a high-power laser generator 1 which, by means of a fold mirror 2, emits a high-power laser beam 3 having an axis P-P in a space 4.

The laser system S1 further comprises a device for ensuring the safety of the space 4 from the effects of the high-power laser beam 3, said safety device comprising:
  a laser generator 5 which generates a low-power-density laser beam 6, also having an axis P-P like the high-power laser beam 3, said power density complying with the NF-EN 60825-1 standard;
  an axicon 7 which receives said low-power-density laser beam 6 and converts it into a low-power conical safety envelope 8, also having an axis P-P. As such, the conical safety envelope 8 is positioned and aligned so as to surround said high-power laser beam 3. The power of the conical safety envelope 8 reduces as it penetrates the space 4, such that it is only present over the portion 3.1 of the high-power laser beam 3 that is provided on the laser system S1 side. It is advantageous for the conical safety envelope 8 to be ocularly safe in order to protect the operators of the laser system S1;

a wide-field optical system 9 which monitors the conical safety envelope 8 from which it receives the optical beam 10, for detecting a possible encounter of an object with said conical safety envelope 8;

a photodetector 11 which receives the optical signal received by the optical system 9 along the optical axis 10 and converts this optical signal, which detects said possible encounter, into an electrical detection signal 12;

a controller 13 which receives said electrical detection signal 12, as well as a measure of the ambient light around the laser system S1, which measure is supplied by a photodiode 14;

a triggering device 15 which receives the signal 16 emitted by the controller 13 and is suitable for triggering the emission by the high-power laser generator 1. FIG. 1 schematically shows the triggering device 15 in the form of a controlled switch, but it goes without saying that said triggering device 15 can be of any suitable kind, such as a mechanical shutter for blocking the laser beam 3, a system stopping the operation of the laser generator 1, a device for cutting off the power supply to the latter, etc.;

a motorised movement system 18 (not shown, since it can be of any known type, such as an X-Y table, Cardan suspension, etc.) for the laser system S1 or at least part of said system, which makes it possible for the axis P-P, shared by the high-power laser beam 3 and the conical safety envelope 8, to scan the space 4 along two rectangular axes X-X, Y-Y; and a computer 17, connected to the laser generators 1 and 5, as well as to the photodetector 11 and the motorised movement system 18, for operating the laser system S1 according to an algorithm described below.

Diagrams A to E in FIG. 2 show the safe operation of the laser system S1.

In diagram A, it has been assumed that the laser generators 1 and 5 are in operation and are emitting the high-power laser beam 3 and the conical safety envelope 8, respectively, whilst an object 19, for example a bird, approaches said envelope. Diagram B shows the situation in which the object 19 encounters the conical safety envelope 8 for the first time. This encounter is detected by the optical system 9, with the result that the photodetector 11 generates the electrical detection signal 12, and that the controller 13, taking account of the ambient light measured by the photodiode 14, triggers the deactivation of the high-power beam 3, by means of the signal 16 and the triggering device 15. This new situation in which the high-power laser beam 3 is deactivated remains for as long as the object 19 is within the conical safety envelope 8 (diagram C). When the object 19 encounters the conical safety envelope 8 for a second time in order to leave said envelope (diagram D), this circumstance is detected once again by the optical system 9 and the photodetector 11, with the result that the controller 13 can trigger the re-establishment of the high-power laser beam 3 (diagram E).

Before any emission of the high-power laser beam 3, in order to prevent an accident, the low-power-density laser beam 6 is emitted as a first measure in order to form the conical safety envelope 8, and the axis P-P of said envelope scans the space 4 in order to check whether an object is within said conical safety envelope 8. If no object is detected, it is possible to proceed to the emission of the high-power laser beam 3.

In order to perform the scan of the space 4 within the conical safety envelope 8, said axis P-P of said envelope can trace a spiral pattern, with the kind of spirals 20 and 21 shown in FIG. 3.

The steps of implementing the high-power laser system S1, which steps are triggered by the algorithm of the computer 17, are thus preferably as follows:

a) initially, the low-power-density laser generator 5 is operated so as to generate the safety envelope 8;

b) then, the space 4 within the conical safety envelope 8 is scanned by having the axis P-P follow a scanning pattern of the kind shown in FIG. 3, in order to ensure that there are no objects within said conical safety envelope 8;

c) then:
if an object is detected within the conical safety envelope 8, there is a wait until the system S1 detects the object for a second time (when exiting the conical safety envelope 8, as shown in diagram B in FIG. 2) and the scanning operation described above is repeated;
if no object is detected, the computer 17 allows the emission of the high-power laser beam 3; and d) if, while the high-power laser beam 3 is being emitted, an object 19 is detected for the first time (diagram B in FIG. 2), the computer 17 cuts off said high-power laser beam 3 (diagram C in FIG. 2) and waits for the second detection of said object (diagram D in FIG. 2), then the computer 17 repeats steps b and c, described above.

The variant S2 of the high-power laser system, according to the present invention and shown schematically in FIG. 4, includes all of the elements described above with respect to the laser system S1 from FIG. 1, except for the wide-field optical system 9, which has been omitted. Indeed, in the laser system S2, which operates identically to what has been described for the laser system S1, the conical safety envelope 8 is monitored by the axicon 7 itself, which receives the optical beam 10 back through the mirror 2, which is provided so as to be transparent to the latter. The optical beam 10 is separated from the laser beam 6 by an optical separator element 22, which directs said optical beam to the photodetector 11, via a focusing device 23.

It should be noted that:
the axicon 7, which forms the conical safety envelope 8 from the low-power-density laser beam 6, may be replaced by another optical element having the same function, such as a mirror 24 which rotates about an axis m-m that is arranged as an extension of the laser beam 6, as is shown in FIG. 5; and
the photodiode 14, which measures the ambient light used to set a threshold for the electrical signal 12 generated by the photodetector 11, may optionally be replaced by software of the computer 17 which detects the slow variations of said electrical signal 12.

It should be noted that, if it is desired for the protection afforded by the conical security envelope 8 to be of an ocular nature, in the vicinity of the laser system S1 or S2, the portion 3.1 of the laser beam 3 protected by said envelope cannot be very long; this is because laser beams 6 of increased power have to be used in order to detect long-range objects 19.

In order to overcome this drawback, the present invention provides the laser system S3 shown in FIG. 6, in which a plurality of laser generators 5 (not shown) generate a plurality of coaxial safety envelopes 8.1, 8.2, 8.3 etc. which are similar to the safety envelope 8 and are arranged one after the other, each of said safety envelopes being embedded in part in the preceding safety envelope, having a greater power density than that of the preceding safety envelope, and having a smaller divergence than that of the preceding safety envelope.

As such, the length of the protected portion of the beam 3 can be progressively increased, said safety envelopes protecting themselves. With respect to FIG. 6, it can be seen that the ocularly safe envelope 8.1, close to the laser system S1 or S2, protects the operators of said system from the laser beam 3 and from the envelope 8.2 over a portion 3.1 of said beam 3, that the safety envelope 8.2, the power of which is greater than that of the envelope 8.1, protects said operators from the laser beam 3 and the envelope 8.3 over a portion 3.2, greater than the portion 3.1, of the beam 3, that the safety envelope 8.3, the power of which is greater than that of the envelope 8.2, protects said operators from the laser beam 3 over a portion 3.3 of said beam that is greater than the portion 3.2, etc.

By virtue of the arrangement in FIG. 6, it is thus possible to detect objects at different distances from the laser system S1, S2, whilst ensuring safety from the high-power laser beam 3. For example, the safety envelope 8.1 is suitable for detecting objects 19, moving at an altitude of at most equal to 1 km, the safety envelope 8.2 is suitable for detecting objects 25, such as aircraft, moving at an altitude of between 1 km and 30 km, and the safety envelope 8.3 is suitable for detecting objects 26, such as satellites, moving at an altitude of greater than 300 km.

The invention claimed is:

1. A method for ensuring the safety of a space through which a high-power laser beam passes, wherein:
    at least one low-power-density safety laser beam is generated in the form of an envelope which is positioned and aligned so as to surround said high-power beam over at least a portion of the length thereof;
    the emission of said high-power laser beam is prevented when an object encounters said safety laser beam; and
    the emission of said high-power laser beam is prevented when an object encounters said safety laser beam for the first time, and the emission of said high-power laser beam is re-established when the same object encounters said safety laser beam for a second time.

2. The method according to claim 1, wherein said safety laser beam surrounds at least an initial portion of said high-power laser beam.

3. The method according to claim 1, wherein said safety laser beam is in the form of a conical envelope which diverges in said space.

4. The method according to claim 1, in which said high-power laser beam can be moved in order to scan said space to be made safe, wherein said safety laser beam is moved together with said high-power laser beam.

5. The method according to claim 1, wherein, before said high-power laser beam is emitted, said safety laser beam traces at least one scanning pattern, which makes it possible to ensure that there are no objects within said envelope formed by said safety laser beam.

6. The method according to claim 5, wherein said scanning pattern is, at least approximately, a spiral.

7. The method according to claim 3, wherein a plurality of coaxial safety laser beams are generated and arranged one after the other, each of said safety laser beams being embedded in part in the preceding safety laser beam, having a greater power density than that of the preceding safety laser beam, and having a smaller divergence than that of the preceding safety laser beam.

8. A device for ensuring the safety of a space through which a high-power laser beam passes, comprising:
    at least one generator of a low-power-density safety laser beam;
    an optical element for giving said safety laser beam the form of a conical envelope which diverges in said space and is positioned and aligned so as to surround said high-power laser beam over at least a portion of the length thereof;
    a photodetector which monitors said envelope formed by the safety laser beam; and
    means for triggering the emission of said high-power laser beam, which means are controlled by said photodetector, the triggering means being capable of preventing the emission of said high-power laser beam when an object encounters said safety laser beam for the first time, and being capable of re-establishing the emission of said high-power laser beam when the same object encounters said safety laser beam for a second time.

9. The device according to claim 8, wherein said optical element for giving said safety laser beam the form of an envelope is an axicon.

10. The device according to claim 9, wherein said photodetector monitors said envelope formed by the safety laser beam through said axicon.

11. The device according to claim 8, wherein said optical element for giving said safety laser beam the form of a conical envelope is a rotating mirror.

12. The device according to claim 8, wherein it comprises means for adjusting a detection threshold of said photodetector to ambient light.

13. A high-power laser system, comprising the safety device specified under claim 8.

* * * * *